United States Patent
Liikanen et al.

(10) Patent No.: US 7,474,491 B2
(45) Date of Patent: Jan. 6, 2009

(54) ADAPTIVE WRITE UNSAFE THRESHOLDS FOR SELF SERVO WRITING

(75) Inventors: Bruce Liikanen, Berthoud, CO (US); Thomas O. Melrose, Longmont, CO (US)

(73) Assignee: Maxtor Corporation, Scotts Valley, CA (US)

(*) Notice: Subject to any disclaimer, the term of this patent is extended or adjusted under 35 U.S.C. 154(b) by 93 days.

(21) Appl. No.: 11/637,257

(22) Filed: Dec. 11, 2006

(65) Prior Publication Data

US 2007/0139809 A1 Jun. 21, 2007

Related U.S. Application Data

(60) Provisional application No. 60/749,229, filed on Dec. 9, 2005.

(51) Int. Cl.
*G11B 21/12* (2006.01)
(52) U.S. Cl. ........................................ 360/75
(58) Field of Classification Search .......... None
See application file for complete search history.

(56) References Cited

U.S. PATENT DOCUMENTS

| | | | |
|---|---|---|---|
| 5,570,244 A | 10/1996 | Wiselogel | |
| 6,654,198 B2 | 11/2003 | Liu et al. | |
| 6,710,953 B1 * | 3/2004 | Vallis et al. | 360/75 |
| 6,714,372 B1 | 3/2004 | Codilian et al. | |
| 6,909,568 B2 * | 6/2005 | Fukushi et al. | 360/75 |
| 6,947,249 B1 | 9/2005 | Hargarten et al. | |
| 6,977,792 B1 | 12/2005 | Melrose et al. | |
| 6,987,632 B2 * | 1/2006 | Ehrlich | 360/75 |
| 6,995,940 B2 | 2/2006 | Ehrlich | |
| 7,106,547 B1 | 9/2006 | Hargarten et al. | |
| 7,106,548 B2 | 9/2006 | Ehrlich | |
| 7,123,433 B1 | 10/2006 | Melrose et al. | |
| 7,136,251 B2 * | 11/2006 | Ehrlich et al. | 360/78.04 |
| 7,136,253 B1 | 11/2006 | Liikanen et al. | |
| 7,227,714 B2 * | 6/2007 | Ehrlich | 360/75 |
| 2003/0142433 A1 | 7/2003 | Shikuma et al. | |
| 2003/0231422 A1 | 12/2003 | Zhang et al. | |
| 2005/0129090 A1 | 6/2005 | Sheperek et al. | |
| 2006/0198045 A1 | 9/2006 | Lim et al. | |

* cited by examiner

*Primary Examiner*—Hoa T Nguyen
*Assistant Examiner*—James L Habermehl
(74) *Attorney, Agent, or Firm*—Fellers, Snider, et al.

(57) ABSTRACT

An apparatus and associated method is provided for observing a positional misplacement of a control object at a first commanded position, defining a fault threshold as a function of the observed positional misplacement, and signaling a write unsafe command to the control object in relation to comparing an instantaneous positional misplacement of the control object to the defined fault threshold during self servo writing with the control object.

21 Claims, 5 Drawing Sheets

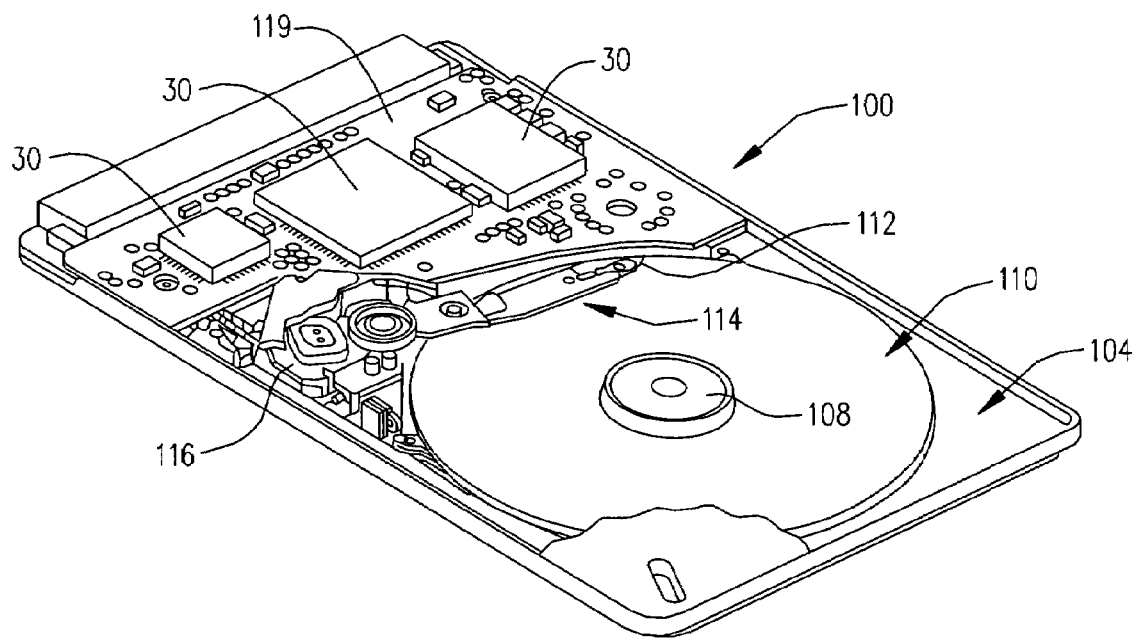
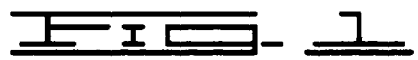
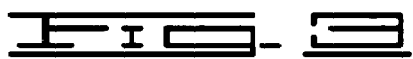

ADAPTIVE WRITE UNSAFE THRESHOLDS FOR SELF SERVO WRITING

RELATED APPLICATIONS

The present application makes a claim of domestic priority under 35 U.S.C. §119(e) to U.S. Provisional Patent Application No. 60/749,229 filed Dec. 9, 2005.

FIELD OF THE INVENTION

The claimed embodiments relate generally to the field of control systems and more particularly, but not by way of limitation, to compensating for positional misplacements in positioning a control object.

BACKGROUND

The ongoing commercialization of data processing devices has generally resulted in successive generations of devices having ever higher rates of functionality and interconnectivity. To this end, mass storage capabilities are being increasingly incorporated into a number of different types of devices, particularly with hand-held portable devices such as cell phones, digital cameras, personal data assistants (PDAs), etc.

A disc drive is one type of data storage device that generally stores data on one or more rotatable recording media. A corresponding array of data transducers (heads) is selectively moved across the surfaces of the media to transduce data therewith. Servo data patterns are often provided on the media to provide transducer positional feedback during such data I/O operations.

With the continued demand for data processing devices with ever higher levels of performance, there remains a continual need for improvements in the manner in which servo control data are written and processed. Without limitation, it is to these and other improvements that preferred embodiments of the present invention are generally directed.

SUMMARY OF THE INVENTION

Embodiments of the present invention are generally directed to an apparatus and method for adaptively setting write unsafe thresholds during self servo writing.

In some embodiments a method is provided including: observing a positional misplacement of a control object at a first commanded position; defining a fault threshold as a function of the observed positional misplacement; and signaling a write unsafe command to the control object in relation to comparing an instantaneous positional misplacement of the control object to the defined fault threshold during self servo writing with the control object.

In some embodiments an apparatus is provided with a control object and a servo circuit. The servo circuit has a programmable processor configured for executing programming instructions stored in memory to observe a positional misplacement of the control object at a first commanded position. The servo circuit is configured to define a fault threshold as a function of the observed positional misplacement. The servo circuit is further configured to signal one or more write unsafe commands to the control object in relation to comparing an instantaneous positional misplacement of the control object to the defined fault threshold during self servo writing with the control object.

In some embodiments a data storage device is provided having a transducer disposed in a data transfer relationship with a storage medium, and means for self servo writing to the medium by adaptively correlating a write unsafe threshold to observed positional misplacements existing in the device.

These and various other features and advantages of preferred embodiments of the present invention will be apparent upon reading the following detailed description and upon review of the associated drawings.

BRIEF DESCRIPTION OF THE DRAWINGS

FIG. 1 is an isometric view of an exemplary data storage device in which embodiments of the present invention can be advantageously practiced.

FIG. 3 diagrammatically depicts two spiral patterns of servo information used by the device of FIG. 1 to write concentric seams of servo wedges.

DETAILED DESCRIPTION

Figure 2:
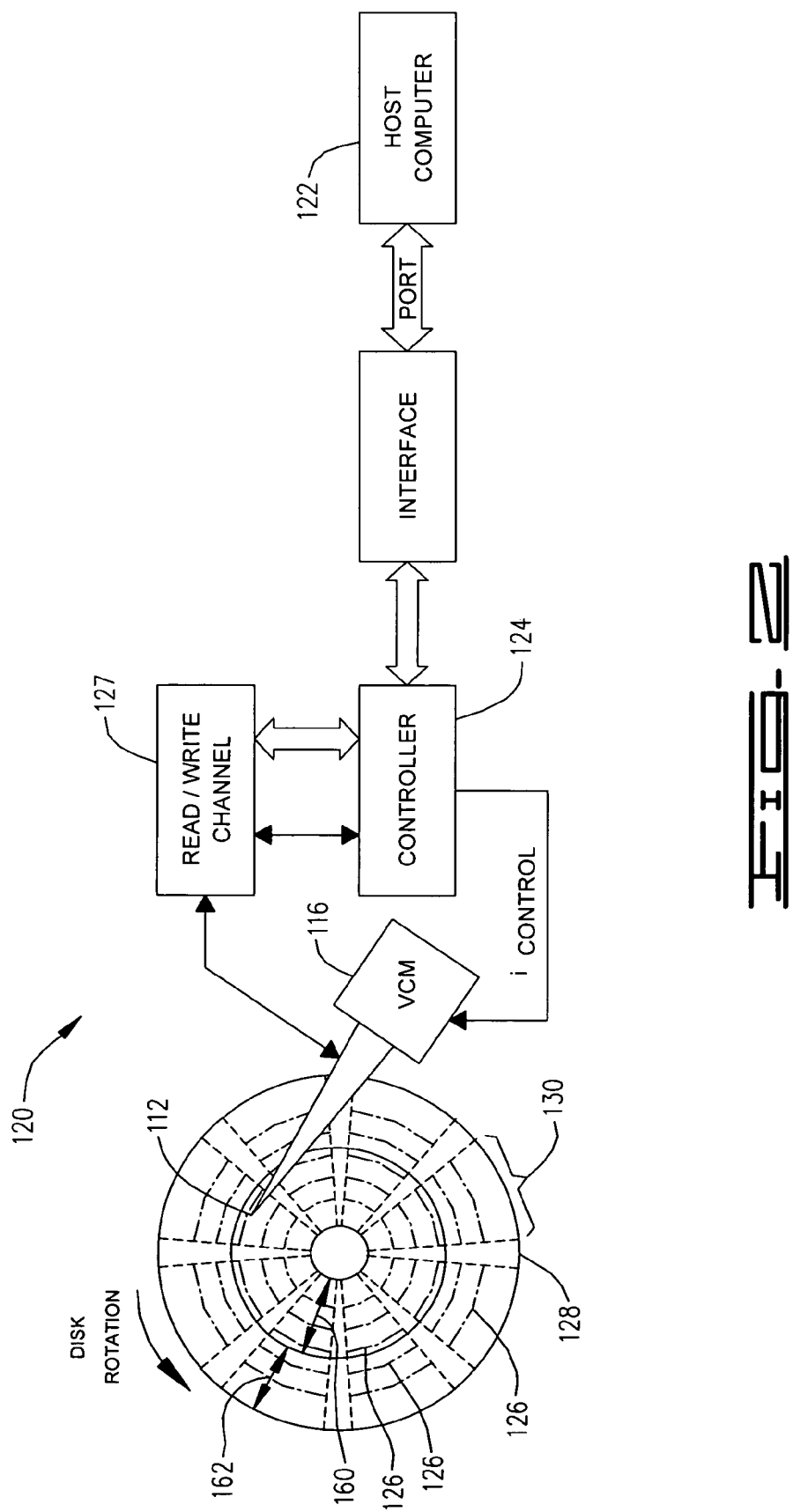
FIG. 2 provides a functional representation of a closed loop servo circuit of the device of FIG. 1.

FIG. 1 provides an isometric view of a data storage device 100. The drive 100 is provided to show an exemplary environment in which embodiments of the present invention can be advantageously practiced. It will be understood, however, that the claimed embodiments are not so limited.

The device 100 includes a substantially sealed housing formed from a base 104 and top (not shown). An internally disposed spindle motor 108 is configured to rotate one or more storage mediums 110. Each storage medium 110 is accessed by a corresponding data transducer 112. While FIG. 1 contemplates the use of one storage medium 110 and a corresponding pair of transducers 112 (one for each surface of the storage medium 110), other numbers of transducers 112 and storage mediums (such as a multi-storage medium stack), as well as other types of storage mediums besides magnetizable media described herein can readily be utilized in the device 100, as desired.

A head-stack assembly ("HSA" or "actuator") is shown at 114. The actuator 114 preferably rotates through application of current to a voice coil motor (VCM) 116. Controlled operation of the VCM 116 causes the transducers 112 to align with tracks (depicted below) defined on the storage medium 110 to store data thereto or retrieve data therefrom.

A flex circuit assembly provides electrical communication paths between the actuator 114 and device control electronics on a printed circuit board (PCB) 119. The flex circuit assembly preferably includes VCM signal paths to accommodate the application of current to the VCM 116, and I/O signal paths to accommodate the transfer of write data to the storage medium 110 and readback data from the storage medium 110, respectively.

FIG. 2 is a functional block diagram for a closed loop servo circuit 120 of the device 100 coupled to a host computer 122.

The host 122 delivers data access requests to the device 100, and user data is transferred between the device 100 and the host 122 during read and write operations.

User data is stored in tracks 126 on the storage medium 110. For purposes of the present description the tracks 126 are generally concentric, but the present embodiments are not so limited. For example, in some embodiments the user data can be stored in one or more spiral tracks.

In some embodiments data is stored in the form of magnetic polarity transitions within each track 126. Data is "read" from the storage medium 110 by positioning the transducer 112 adjacent a desired track 126 of the rotating storage medium 110 and sensing the magnetic polarity transitions stored within the track 126. Similarly, data is "written" to the storage medium 110 by positioning the transducer 112 adjacent a desired track 126 and delivering a write current to the transducer 112 that is representative of the data being stored.

The VCM 116 operates in response to a control signal $i_{control}$ that is generated by a servo controller 124. The servo controller 124 is preferably characterized as a programmable processor with associated servo code to direct the operation of the servo circuit. The servo controller 124 generally operates in two primary modes, seeking and track following. Seeking generally involves controlled movement of the transducer 112 from an initial track 126 to a destination track 126. Track following generally comprises operation of the controller 124 to maintain the transducer 112 at a commanded position with respect to a particular track 126 in order to carry out I/O operations with the track 126.

The read/write channel 127 operatively processes the data being transferred to/from the storage medium 110. During a read operation the read/write channel 127 preamplifies and filters analog read signals generated by the transducer 112 into a digital data signal recognizable by the controller 124. This includes recovering timing information from the analog read signal. During a write operation, the read/write channel 127 converts user data received from the host 122 into a write current signal to the transducer 112 that imparts magnetic polarity transitions to the storage medium 110 that are representative of the user data. The read/write channel 127 furthermore continually digitizes servo information stored on the storage medium 110 for use by the controller 124 in servo positioning the transducer 112.

The storage medium 10 shows a typical organization of stored data within a plurality of concentric data storage tracks 126. For clarity the data storage tracks 126 are illustrated as center lines on the surface of the storage medium 110. However, it is understood by the skilled artisan that the tracks 126 actually each occupy a finite width defining an annular storage space that passes by the respective transducer 112. For purposes of this description the term "pass" can mean a revolution of the storage medium 110 with the transducer 112 radially disposed so as to be in a data transfer relationship with the track 126, although the present embodiments and the appended claims are not so limited.

In a generally preferred arrangement servo information is stored on the storage medium 110 in each of a plurality of radially aligned servo spoke regions 128. Preferably, the servo information is arranged in the form of ABCD quadrature dibit patterns that are used to generate a position error signal (PES) to the controller 124 for servo positioning the transducer 112. User data are stored in regions 130 between adjacent servo spoke regions 128. Addressable data sectors are defined in the regions 130 to store the user data, typically in fixed-size blocks such as 512 bytes.

It should be understood that for clarity of illustration only a few tracks 126 and servo spoke regions 128 are shown in FIG. 2. Also, it will also be understood by the skilled artisan that the data format arrangement of FIG. 2 is merely exemplary in nature and any number of other arrangements can readily be used in alternative equivalent embodiments.

During the manufacturing process a servo track writer (STW) is typically used to write some or all of the servo information to the storage medium 110. Some STWs contain a transducer and a motor for rotating the storage medium 110 in order to write the servo information to the storage medium 110, which is subsequently placed into the data storage device 100 ("ex-situ servo writing"). Other types of STWs position the transducer 112 within a built up data storage device 100 ("in-situ servo writing"). In any event, a STW is a very significant capital investment, and is wisely utilized as efficiently as possible during manufacturing operations. Even a small reduction in the amount of data written by a STW results in significant cost and time savings.

As the areal density of data storage has increased, requiring ever-more tracks 126 per radial span (tracks per inch or TPI), the amount of time necessary to write the servo information increases. That is, in previous attempted solutions the number of passes by a STW is directly related to the TPI. Thus, manufacturers are faced with either supplying more STWs or incurring the penalty of reduced throughput.

Instead of using a STW to write the concentric tracks 126 of servo information, the present embodiments contemplate using a STW to write temporary servo patterns that can subsequently be used by the device 100 to servo position the transducer 112 independently of an STW ("self servo writing").

In some embodiments the temporary servo patterns can be in the form of spirals of synchronization information (sync marks). FIG. 3 diagrammatically depicts two such spirals 132, 134 of sync marks written to the storage medium 110 by a STW. Servo information defining a concentric data track 126 is subsequently written by the device 100 by servo positioning on the sync marks in the plurality of spirals 132, 134. Each sync mark along a particular spiral 132, 134 corresponds to a unique radial location, and each spiral 132, 134 crosses the track 126 only once. Accordingly, the sync marks can be used by the device 100 to precisely servo position the transducer 112 for self servo writing the concentric tracks 126.

Preferably, the necessary number of spirals 132, 134 of servo information is related to the device 100 servo sample rate. For example, if a servo sample rate of 120 equally-spaced servo sectors per track 126 is required, then an integral multiple number of spirals 132, 134 can be written on the storage medium 110. Accordingly, by writing servo information in a spiral fashion in this manner, the STW cycle time is dependent on an integral multiple of the device servo sample rate rather than the number of data tracks.

It will be noted that the use of spiral-shaped temporary servo patterns is merely illustrative and not limiting of the embodiments of the present invention. For example, in alternative equivalent embodiments concentric patterns of temporary servo information can be written by the STW.

Embodiments of the present invention contemplate the device 100 executing programming instructions stored in memory to effectively minimize if not prevent the misplacement of servo wedges during self servo writing. In some embodiments the programming instructions can be stored to the storage medium 110 by the STW. Alternatively, the programming instructions can be transferred by the host 122.

Initially, a positional misplacement of the transducer 112 is determined at one or more commanded positions. For purposes of this description and meaning of the appended claims the term "positional misplacement" generally means a discrepancy between an expected position of the transducer 112 and its instantaneous position. As described below, positional misplacements can result either from a radially directed off track condition measured in terms of a position error signal, or a circumferentially directed off timing condition measure in terms of a timing error signal.

By first observing a positional misplacement of the transducer 112, the present embodiments can thereby statistically predict the dispersion of servo wedges with respect to their commanded locations on the storage medium 110. The positional misplacement in terms of position error signal can be determined, for example, by track following the transducer 112 at a target track 126 and observing the variance with which the transducer 112 is instantaneously positioned with respect to the track centerline (commanded position) at each of the plurality of sync marks of servo information.

The variance of N position error measurements is determined by the following relationship:

$$\sigma^2 = \frac{1}{N}\sum_{i=1}^{N}(x_i - \bar{x})^2$$

Calculating the square root of the variance yields the standard deviation of the population distribution. The standard deviation is a measure of the observed nonrepeatable runout (NRO) of the system that adversely affects the attempt to uniformly write the servo wedges in concentric seams. The present embodiments address this problem by adaptively setting positional misplacement limits beyond which servo wedges are not written during a particular pass. The servo wedges not written will rather be written during one or more subsequent passes when, by means of natural process variation, the transducer 112 will be located within the confines of the adaptively defined misplacement limits.

Figure 4:
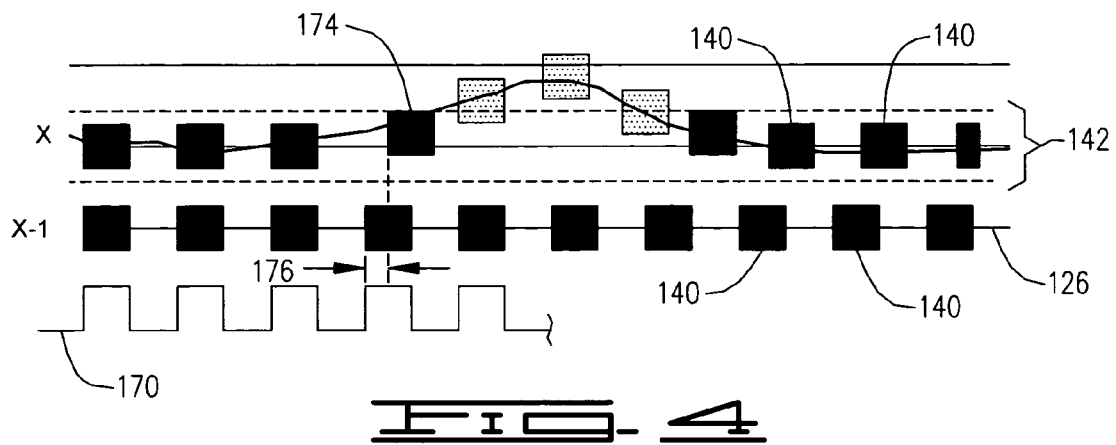
FIG. 4 diagrammatically depicts two partial seams of servo wedges in relation to an adaptively defined fault threshold in accordance with embodiments of the present invention.

More particularly, FIG. 4 diagrammatically depicts part of a seam of servo wedges 140 written to the track 126 denoted X-1. For clarity this partial seam is illustrated linearly as opposed to it actually being arcuately disposed as part of the concentric seam on the track 126. The seam on track X-1 is also illustrated as being ideally located on the track 126 centerline. The next track written, denoted X, depicts a number of transducer 112 positions where, if written, the servo bits 140 will be disposed at undesirable off track positions. For the purpose of signaling a write unsafe command, a spatial threshold 142 is defined around each track 126 centerline. If the instantaneous position of the transducer 112 breaches the threshold 142, then the present embodiments signals the write unsafe command, thereby preventing the write command that would otherwise be sent to the transducer 112 to write the respective servo wedge 140 during that pass.

Accordingly, the present embodiments contemplate servo wedges 140 being written to each of a plurality of sectors of the storage medium 110 for which the position error signal is less than the fault threshold 142 during a first pass of the transducer 112. Preferably, only the servo wedges 140 not written during the first pass are subsequently written during one or more additional passes when they become, as the result of natural process variation, located within the confines of the threshold 142.

Figure 5:
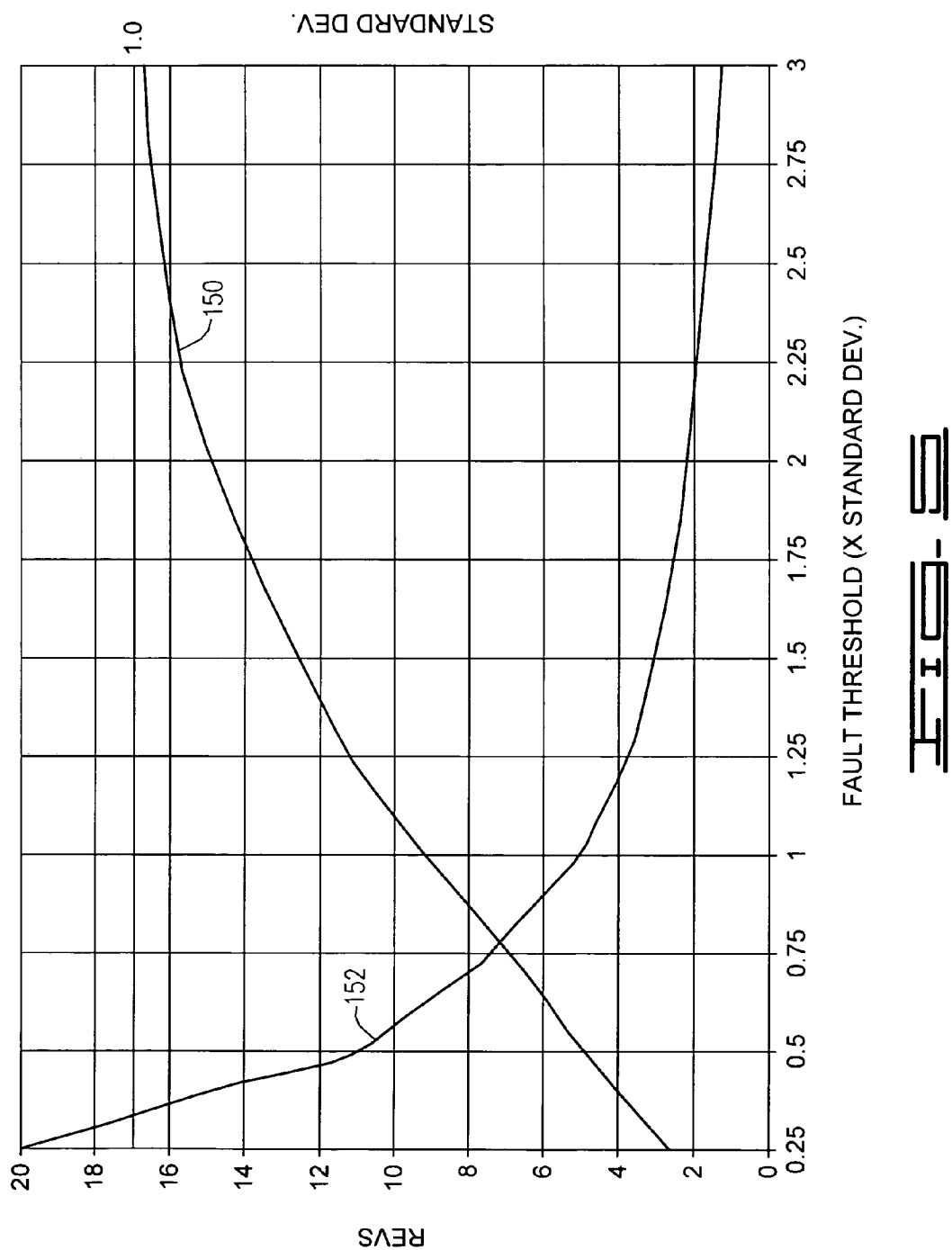
FIG. 5 graphically depicts the statistical correlation of the fault threshold to the expected quality of a seam of servo wedges and the expected number of passes necessary to fill the seam.

FIG. 5 is a graph of results obtained during reduction to practice of the present embodiments. The observed NRO was 17 counts (or increments), which is denoted in the right-side ordinate scale as 1.0 standard deviation. The abscissa signifies multipliers of the standard deviation that are selectable as the extent of the fault threshold 142. Assuming a Gaussian population distribution, plot 150 depicts a corrected standard deviation value for the population of servo wedges 140 that satisfy a selected fault threshold 142. For example, a selected fault threshold of one standard deviation will reduce the standard deviation of the population of servo wedges written during a pass to about 9 counts, providing about a 47% decrease in NRO. Plot 152 depicts the average number of passes necessary to completely fill the seam. For example, for the fault threshold 142 of one standard deviation it will take an average of five passes to fill the seam of servo wedges 140.

By adaptively sizing the fault threshold 142 in view of the observed NRO, users of the present embodiments are able to optimally manage the trade offs between throughput and quality. For example, for a selected seam quality a maximum number of subsequent passes can be defined in relation to the plot 152 of expected number of necessary passes. For a given track 126, if one or more servo wedges 140 have not yet been written within the maximum number of subsequent passes, then corrective measures can be applied to those wedges 140. For example, without limitation, they can be written unconditionally, or alternatively the write signal strength can be temporarily increased to enlarge the radial extent of the servo wedge 140.

Even more advantageously, the present embodiments contemplate adaptively correlating the fault threshold 142 to the NRO as the NRO changes with respect to location of the storage medium 110. Generally, the NRO can be relatively greater at outer radial portions as opposed to inner radial portions of the storage medium 110, due to influences such as windage and disc flutter.

Accordingly, the present embodiments contemplate observing the NRO at an inner zone 160 (FIG. 2) of servo tracks 126 and adaptively defining the fault threshold 142 in relation to that observed NRO. However, the NRO is also observed for the outer zone 162 (FIG. 2) of tracks 126 and the fault threshold 142 is adaptively redefined in relation to that observed NRO. Although only two zones 160, 162 are illustrated, preferably the NRO is independently observed and the fault threshold 142 is adaptively redefined for more than two zones. Using a larger plurality of zones optimally reaps the benefits of correlating the fault threshold 142 to the observed NRO more smoothly as the NRO incrementally changes across the storage medium 110.

From the foregoing it will be noted that by correlating the fault threshold 142 to observed NRO, the user is able to select the threshold 142 that provides a desired seam quality or a desired number of passes. By setting constant the desired seam quality or desired number of passes across all zones 160, 162 of tracks 126, the user is able to optimally manage the tradeoffs between quality and throughput. That is, for a selected fault threshold 142 size, such as the one standard deviation described above, relatively fewer passes will be required at the inner zones in comparison to the passes required at the outer zones. Thus, for a target self servo write cycle time, proportionally more of the cycle time is budgeted for outwardly disposed tracks 126 in comparison to the budget for inwardly disposed tracks 126, when the NRO generally increases in moving outwardly on the storage medium 110. This approach yields a full complement of tracks 126 with substantially constant quality for a designated self servo write cycle time. Alternatively, the correlation of the present embodiments can be effectively used to set a desired constant number of passes for the entire storage medium 110 and screen out nonconforming product, such as by the indicated fault threshold 142 size or the observed number of servo wedges 140 not written within the allotted number of passes.

Figure 6:
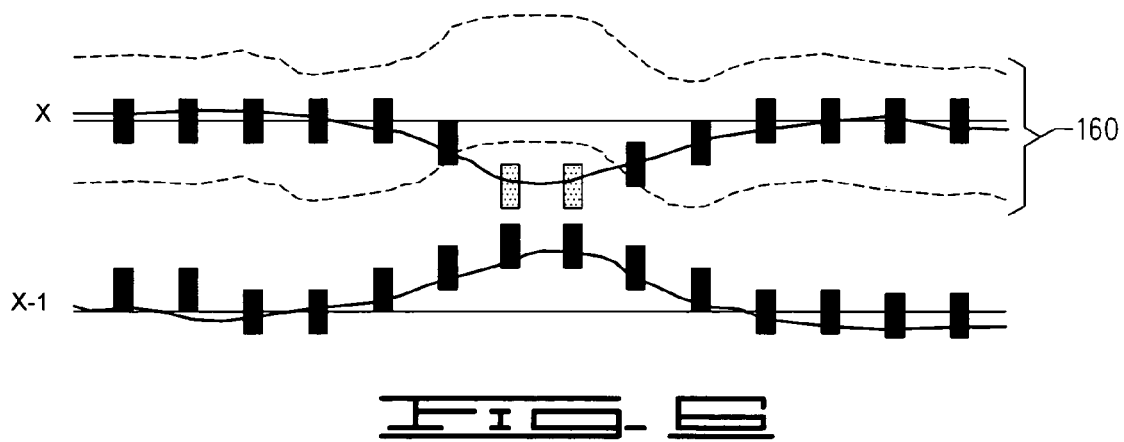
FIGS. 6 and 7 diagrammatically depict two partial seams of servo wedges in relation to adaptively defined dynamic fault thresholds in accordance with embodiments of the present invention.
Figure 7:
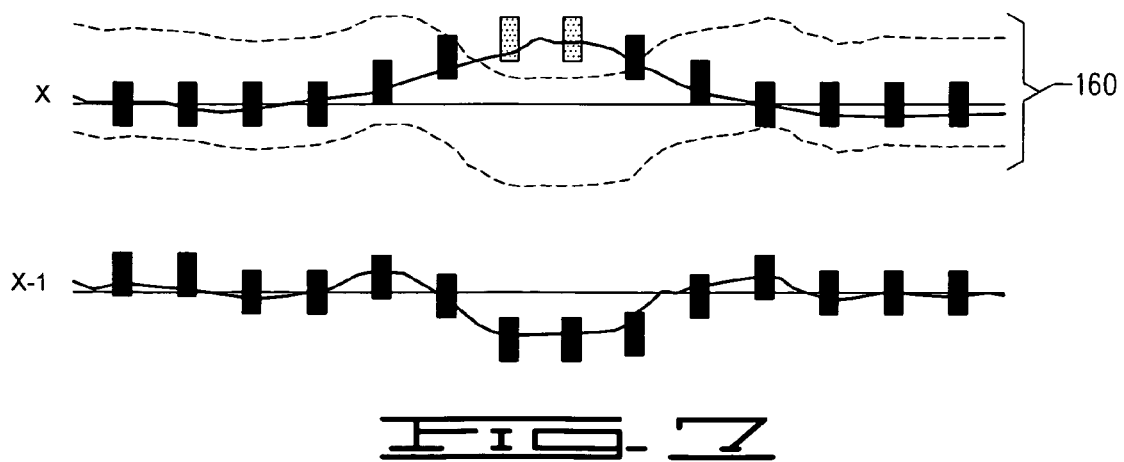

The embodiments described heretofore adaptively define a fault threshold 142 in the form of a fixed band around the track 126 centerline. In alternative equivalent embodiments the fault threshold is variable to signal the write unsafe signal in the event of a track squeeze condition, as depicted in FIG. 6 or a track stretch condition ("negative track squeeze"), as depicted in FIG. 7. When adjacent tracks 126 are displaced toward each other there is a consequential reduction in servo gain between the two seams, which increases the likelihood of encroachment. When adjacent tracks 126 are displaced away from each other there is a consequential increase in servo gain, which increases the likelihood of system instability.

To resolve these problems the present embodiments contemplates compensating the adaptively defined fixed threshold 142 by the effects of the positional misplacement of the previously written servo wedge 140 at the same sector. That is, dynamic adaptive thresholds 160 are depicted in FIGS. 6 and 7 that shift the limits of positional misplacement for signaling a write unsafe command in the same direction and to the same extent as the position error signal of the previously written servo wedge at the particular sector. In both cases the dynamic fault threshold 160 triggers the write unsafe command, due to track squeeze and track stretch in FIGS. 6 and 7, respectively, for transducer locations that otherwise would have been within the confines of the fixed threshold 142.

In order to dynamically compensate the fault threshold 160 in this manner, the position error signal values observed when writing track X-1 can be stored in memory for each sector. Subsequently, the fault threshold 160 while writing track X is shifted sector-by-sector by recalling from memory and adding the value of the previous servo wedge 140 at the respective sector.

In some embodiments dynamically compensating the fault threshold can be used to signal the write unsafe command before writing a servo wedge on track X that would otherwise create a squeeze or stretch condition. However, in some embodiments the squeeze or stretch condition will not be observed until after the servo wedge creating the condition has been written. For example, where the sync marks are interleaved between adjacent servo wedges, positional interpolation is required in writing each servo wedge. If, after the fact, it is determined a stretch condition has been created, the servo wedge creating the stretch condition can be rewritten during a subsequent pass. However, a servo wedge written to track X that creates a squeeze condition can require rewriting the servo wedges written to both track X and track X-1.

As previously mentioned, the positional misplacement that is contemplated by the present embodiments can be a timing error signal as well as the position error signal described above. Returning to FIG. 4, a write clock signal 170 is depicted as leading a position of the transducer 112 when it wrote the servo wedge denoted as 174. The timing error signal associated with the lead time discrepancy depicted as 176 can form the basis for correlating the fault threshold to observed positional misplacement in the same manner as described hereinabove for position error.

Also, analogous to the track squeeze conditions described above, incorrect circumferential spacing between adjacent servo wedges can create adverse incoherence conditions in the data readback signal. As in the solution for resolving position errors, the present embodiments contemplate storing in memory the circumferential location of a previous servo wedge, and then comparing the instantaneous position of the next servo wedge with the position of the previous servo wedge to signal a write unsafe command when appropriate to prevent arrangements conducive to incoherence of the adjacent servo wedges.

Figure 8:
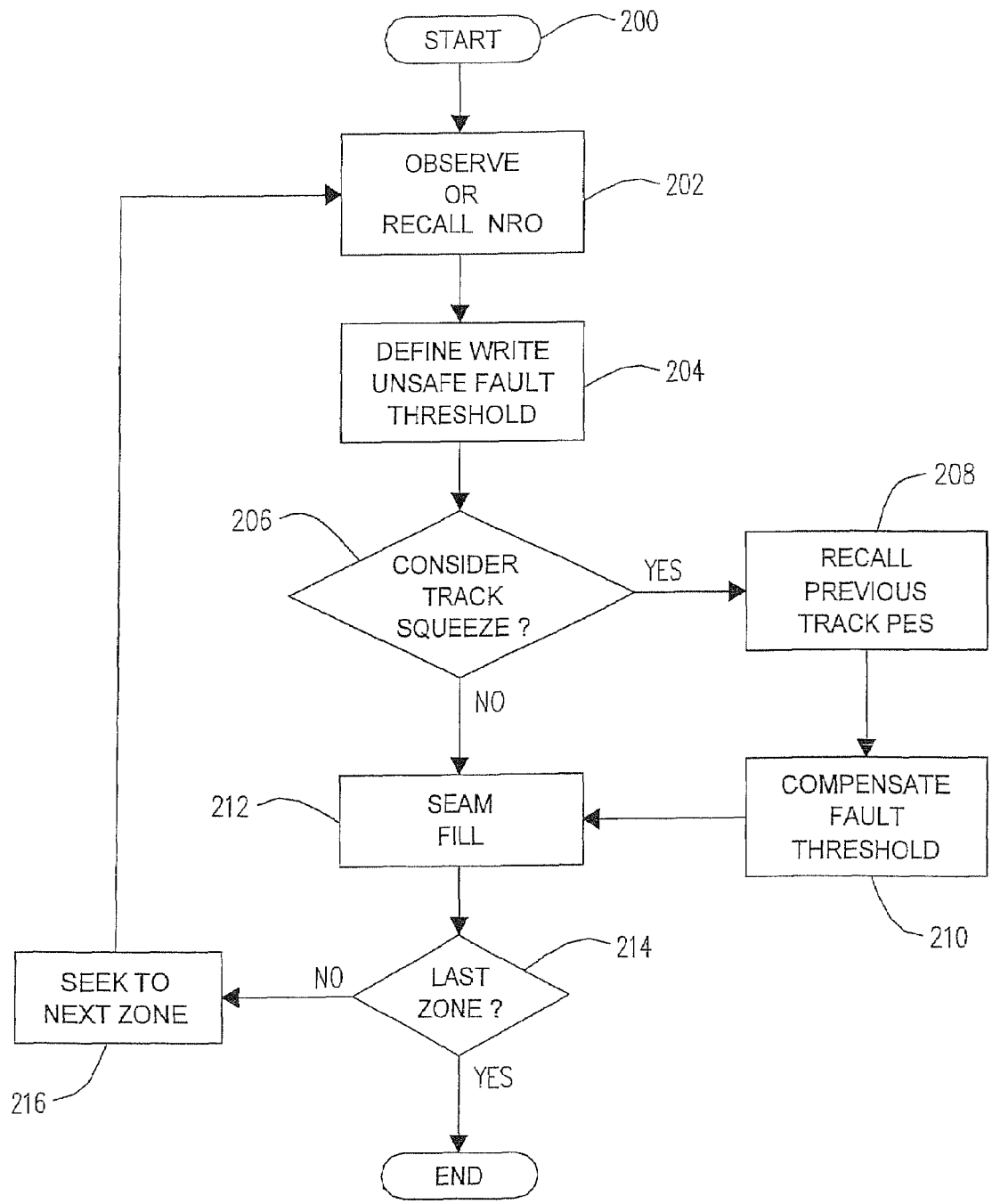
FIG. 8 is a flowchart illustrating steps for practicing a method in accordance with embodiments of the present invention.

FIG. 8 is a flowchart illustrating steps for practicing a method 200 generally in accordance with embodiments of the present invention. The method 200 begins at block 202 by observing a positional misplacement, such as the position error depicted or otherwise such as the timing error discussed above. In alternative equivalent embodiments the NRO can be previously observed and stored in memory, and recalled from memory in block 202. Given the observed NRO, in block 204 the write unsafe fault threshold is defined, such as in terms of a desired seam quality or a desired number of passes to fill the seam. In block 206 it is determined whether track squeeze is to be considered in signaling the write unsafe command. If the determination of block 206 is yes, then the position error of the previous servo wedge 140 at the particular sector is recalled from memory in block 208. In block 210 the fixed fault threshold previously defined in block 204 is dynamically compensated, such as on a sector-by-sector basis. Control then passes to block 212 where the seam is filled with respect to the adaptively defined fault threshold 160.

In block 214 it is determined whether the last zone has been addressed by the seam fill operation of block 212. If the determination of block 214 is no, then the transducer seeks to the next zone in block 216 and the method returns to block 202 where the NRO is observed (or recalled from memory) for the next zone. The method then proceeds as before, next adaptively redefining the write unsafe fault threshold in block 204 and so on.

Generally, embodiments of the present invention contemplate a data storage device with a transducer disposed in a data transfer relationship with a storage medium, and means for self servo writing to the storage medium by adaptively correlating a write unsafe fault threshold to observed positional misplacements existing in the system. For purposes of this description and meaning of the appended claims, the term "means for self servo writing" contemplates a servo circuit as depicted in FIG. 2 with programming instructions stored in memory for executing the steps of the method 200 of FIG. 8, and equivalents thereof. The term "means for self servo writing" expressly does not include previous attempted solutions that do not correlate the write unsafe fault threshold to observed positional misplacements, such as those that arbitrarily set a fixed cycle time for all passes or that merely relate the cycle time for passes to the circumferential length of the respective seams.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
   observing a positional misplacement of a control object at a first commanded position;
   adaptively correlating a fault threshold to the observed positional misplacement;
   signaling a write unsafe command to the control object in relation to comparing an instantaneous positional misplacement of the control object to the fault threshold during self servo writing with the control object.

2. The method of claim 1 wherein the control object comprises a transducer of a data storage device that is positionable in a data transfer relationship with a storage medium, and wherein the positional misplacement comprises a timing error signal value generated by comparing a circumferential position of a sync bit on the storage medium to a write clock signal.

3. The method of claim 1 wherein the control object comprises a transducer of a data storage device that is positionable in a data transfer relationship with a storage medium, and wherein the positional misplacement comprises a position error signal value generated by comparing a detected radial position of the transducer to a commanded position.

4. The method of claim 3 wherein servo information is written to each of a plurality of sectors of the storage medium for which the position error signal value is less than the fault threshold during a first pass of the transducer, and wherein servo information is written during a subsequent pass of the transducer only to one or more sectors for which servo information was not written during the first pass.

5. The method of claim 4 wherein the observing step is performed at a first radial location of the storage medium, and further comprising:
observing a position error signal value of the transducer at a second radial location of the storage medium;
redefining the fault threshold as a function of the observed position error signal value at the second radial location; and
signaling one or more write unsafe commands to the transducer in relation to comparing position error signal values of the transducer to the redefined fault threshold during self servo writing.

6. The method of claim 5 wherein the first and second radial locations are characterized as different tracks of the storage medium.

7. The method of claim 6 wherein the first and second radial locations are characterized as tracks within different zones of the storage medium.

8. The method of claim 6 wherein the defining and redefining steps provide fault thresholds resulting in a predicted quality of a seam of servo information.

9. The method of claim 8 wherein the predicted quality at the first and second radial locations is substantially constant.

10. The method of claim 6 wherein the defining and redefining steps provide fault thresholds resulting in a predicted number of passes necessary to complete a seam of servo information.

11. The method of claim 10 wherein the predicted number of passes to complete the seam at the first and second radial locations is substantially constant.

12. The method of claim 3 wherein the signaling step comprises signaling a write unsafe signal when position error signal values associated with track squeeze of the storage medium exceed the fault threshold.

13. The method of claim 12 wherein the defining step comprises storing an instantaneous positional misplacement to memory.

14. The method of claim 13 wherein the defining step comprises comparing a subsequent instantaneous positional misplacement to the instantaneous positional misplacement stored in memory.

15. The method of claim 1 characterized by executing programming instructions that are stored in memory.

16. An apparatus comprising:
a control object; and
a servo circuit comprising a programmable processor configured for executing programming instructions stored in memory to observe a positional misplacement of the control object at a first commanded position, adaptively correlate a fault threshold to the observed positional misplacement, and signal one or more write unsafe commands to the control object in relation to comparing an instantaneous positional misplacement of the control object to the defined fault threshold during self servo writing of servo information with the control object.

17. The apparatus of claim 16 characterized as a data storage device wherein the control object comprises a transducer that is disposable in a data transfer relationship with a storage medium, wherein the positional misplacement comprises a position error signal value generated by comparing a detected radial position of the transducer to a commanded position.

18. The apparatus of claim 17 wherein the servo circuit observes the position error signal value at a first radial location of the storage medium, and further operates to observe another position error signal value of the transducer at a second radial location of the storage medium, redefine the fault threshold as a function of the observed position error signal value at the second radial location, and signal one or more write unsafe commands to the transducer in relation to comparing position error signal values of the transducer to the redefined fault threshold during self servo writing.

19. The apparatus of claim 18 wherein the servo circuit operates to provide fault thresholds resulting in a characteristic from a set consisting of a substantially constant predicted quality of a seam of servo information at the first and second radial locations and a substantially constant number of passes necessary to complete a seam of servo information.

20. A data storage device, comprising:
a transducer disposed in a data transfer relationship with a storage medium; and
means for self servo writing to the medium by adaptively correlating a write unsafe threshold to observed positional misplacement in the device.

21. A method comprising:
observing a positional misplacement of a control object at a first commanded position associated with a first track of a storage medium;
defining a fault threshold as a function of the observed positional misplacement;
signaling a write unsafe command to the control object in relation to comparing an instantaneous positional misplacement of the control object at a second commanded position associated with a second track to the defined fault threshold during self servo writing with the control object.

* * * * *

UNITED STATES PATENT AND TRADEMARK OFFICE
CERTIFICATE OF CORRECTION

PATENT NO. : 7,474,491 B2  Page 1 of 1
APPLICATION NO. : 11/637257
DATED : January 6, 2009
INVENTOR(S) : Bruce Liikanen et al.

It is certified that error appears in the above-identified patent and that said Letters Patent is hereby corrected as shown below:

In Col. 3, line 44
replace "storage medium 10"
with "storage medium 110."

In Col. 10, line 17
replace "object to the defined fault"
with "object to the fault."

Signed and Sealed this

Seventeenth Day of March, 2009

JOHN DOLL
*Acting Director of the United States Patent and Trademark Office*